US008370371B1

(12) United States Patent
Moncla et al.

(10) Patent No.: US 8,370,371 B1
(45) Date of Patent: Feb. 5, 2013

(54) BUSINESS CONSTRUCTS

(75) Inventors: Brenda Moncla, Hinckley, OH (US); Sujit Ghosh, Solon, OH (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 51 days.

(21) Appl. No.: 13/008,750

(22) Filed: Jan. 18, 2011

(51) Int. Cl.
G06F 17/30 (2006.01)
G06F 17/00 (2006.01)

(52) U.S. Cl. .................... 707/756; 717/120; 709/202

(58) Field of Classification Search .................. 707/756; 717/120; 709/202, 217, 246, 219, 232
See application file for complete search history.

(56) References Cited

U.S. PATENT DOCUMENTS

| | | | |
|---|---|---|---|
| 6,529,909 B1 | 3/2003 | Bowman-Amuah | |
| 6,529,948 B1 | 3/2003 | Bowman-Amuah | |
| 6,539,396 B1 | 3/2003 | Bowman-Amuah | |
| 6,601,233 B1 | 7/2003 | Underwood | |
| 6,601,234 B1 | 7/2003 | Bowman-Amuah | |
| 6,609,123 B1 | 8/2003 | Cazemier et al. | |
| 6,615,199 B1 | 9/2003 | Bowman-Amuah | |
| 6,839,724 B2 | 1/2005 | Manchanda et al. | |
| 7,058,615 B2 | 6/2006 | Yao | |
| 7,185,016 B1 | 2/2007 | Rasmussen | |
| 7,313,576 B2 * | 12/2007 | Clark et al. | ............................ 1/1 |
| 7,673,282 B2 | 3/2010 | Amaru et al. | |
| 7,676,478 B2 | 3/2010 | Rausch | |
| 7,761,406 B2 | 7/2010 | Harken | |
| 7,779,051 B2 | 8/2010 | Friedlander et al. | |
| 8,145,653 B2 * | 3/2012 | Kosov et al. | .................. 707/756 |
| 2002/0161778 A1 | 10/2002 | Linstedt | |

OTHER PUBLICATIONS

U.S. Appl. No. 13/008,684, filed Jan. 18, 2011.

* cited by examiner

*Primary Examiner* — Yicun Wu
(74) *Attorney, Agent, or Firm* — Buchanan Ingersoll & Rooney PC; Robert J. Pugh

(57) ABSTRACT

Various systems, processes, tools and techniques are provided for managing and processing data within a computing environment including a data warehouse component. Certain embodiments of the business construct of the invention can provide an interim stage for mapping data prior to loading the data into the data warehouse. When embodied as standard interface files, each of the business constructs can represent a business object that is of importance to a corporate entity or other enterprise.

20 Claims, 32 Drawing Sheets

| # | Field Name | Data Definition | Data type | Reference Data | History | Pertains To | Basel | Credit Risk Book | CQB | OCC | Distressed Assets |
|---|---|---|---|---|---|---|---|---|---|---|---|
| 1 | Reporting Date | Calendar date which defines the end of the time period to which this data applies | Date | | | Customer | X | X | | | |
| 2 | Customer ID | The unique identifier of a Customer | Text | | | Customer | X | X | X | X | |
| 3 | Source System ID | A code used to identify a Source System of the customer. | Text | Y | | Customer | X | X | X | | |
| 4 | Bank Number | The bank number of the bank that owns this customer | Text | Y | | Customer | X | X | | | |
| 5 | Assigned Branch | Assigned Branch with bank number uniquely identifies owning branch of the customer. | Text | Y | | Customer | X | X | | | |
| 6 | CIF Key | The CIF Key generated by the source system | Text | | | Customer | | | | | |
| 7 | Customer Type | Identifies the type of the customer. (Individual or Organization) | Text | Classification | | Customer | X | X | X | | |
| 8 | Customer Open Date | This date customer was added to the source system; typically this corresponds to first account open date. | Date | | | Customer | | | | | |
| 9 | Customer First Name | The first name of the customer. This may hold name of the primary owner of an organization. | Text | | | Individual | | | X | X | |
| 10 | Customer Last Name | The last name of the customer. This may hold name of the primary owner of an organization. | Text | | | Individual | | | X | X | |
| 11 | Customer Middle Name | The middle name of the customer. This may hold name of the primary owner of an organization. | Text | | | Individual | | | X | X | |
| 12 | Salutation Name | Identifies the part of the name by which a customer is addressed | Text | | | Individual | | | X | | |
| 13 | Suffix Name | Identifies the part of the name which is added at the end in order to aid in identification of the customer. | Text | | | Individual | | | X | X | |
| 14 | Customer DOB | The Date of Birth of the customer (Mandatory only for Individuals) | Date | | | Individual | | | | | |
| 15 | Customer TIN | The Taxpayer Identification Number of the customer. | Text | | | Customer | X | X | X | X | |
| 16 | Customer Name | Identifies the name of the customer | Text | | | Customer | X | X | X | X | |
| 17 | Date of Incorporation | The date of establishment of the organization (Mandatory only for Organization) | Date | | | Organization | | | | | |
| 18 | Customer Address Line 1 | Address line 1 of the customer. Address lines 1 to 5 represent home/primary residence address for individuals and business address for organization. | Text | | | Customer | | X | X | | |
| 19 | Customer Address Line 2 | Address line 2 of the customer | Text | | | Customer | | X | X | X | |
| 20 | Customer Address Line 3 | Address line 3 of the customer | Text | | | Customer | | X | X | X | |
| 21 | Customer Address Line 4 | Address line 4 of the customer | Text | | | Customer | | X | X | X | |
| 22 | Customer Address Line 5 | Address line 5 of the customer | Text | | | Customer | | X | X | X | |
| 23 | Customer City | The city name of the customer | Text | | | Customer | | X | X | | |
| 24 | Customer State Code | The State code of the customer | Text | | | Customer | | X | X | X | |
| 25 | Customer Zip Code | The zip code of the customer | Number | | | Customer | | X | X | X | |
| 26 | Country Code | The country code of the customer | Text | | | Customer | X | X | X | X | |
| 27 | Home Phone Number | Identifies Home Phone Number | Number | | | Individual | | | | | |
| 28 | Business Phone Number | Identifies Work Phone Number | Number | | | Customer | | | | | |
| 29 | Primary Email Address | The customer's primary e-mail address. | Text | | | Customer | | | | | |
| 30 | Secondary Email Address | The customer's secondary e-mail address. | Text | | | Customer | | X | | | |
| 31 | Last Maintenance Date | Last customer record updation date | Date | | | Customer | | | | | |

FIGURE 2A

| # | Field Name | Data Definition | Data type | Reference Data | History | Pertains To | Basel | Credit Risk Book | CQB | OCC | Distressed Assets |
|---|---|---|---|---|---|---|---|---|---|---|---|
| 32 | D&B Number | The Dun and Bradstreet number that uniquely identifies the customer. (Mandatory only for Organization) | Text | | | Organization | X | X | | | |
| 33 | Bankruptcy Code | The code to indicate the bankruptcy status of the customer (0-Not bankrupt, 1-Chapter 11, 2-Chapter 12, 3-Chapter 13, 7-Chapter 7) | Number | Classification | | Customer | | X | | | |
| 34 | Responsible Officer ID | Officer responsible for the customer. | Text | | | Customer | | | | | |
| 35 | Secondary Officer ID | Secondary bank officer responsible for customer | Text | | | Customer | | | | | |
| 36 | Customer Deceased Flag | Flag to indicate whether customer is Deceased. | Flag | | | Individual | | | | | |
| 37 | Telephone Solicitation Opt Out | Flag to indicate whether the customer has requested not to be solicited by telephone. (Y/N) | Flag | | | Individual | | | | | |
| 38 | Mail Solicitation Opt Out Flag | Flag to indicate whether the customer has requested not to be solicited by mail. (Y/N) | Flag | | | Individual | | | | | |
| 39 | Electronic Solicitation Opt Out | Flag to indicate whether the customer has requested not to be solicited electronically. (Y/N) | Flag | | | Individual | | | | | |
| 40 | Internal Entity Flag | Flag to identify whether the customer is an internal legal entity / affiliate/staff. | Flag | | | Customer | X | | | | |
| 41 | Employer Name | The employer's name of the customer | Text | | | Individual | | | | | |
| 42 | Financial Statement Currency | Primary Currency of the organization in which Financial statements are reported. Only to be populated for customer type organization | Text | | | Customer | X | X | | | |
| 43 | Total Assets | The amount of the total assets of the consolidated group in Financial Statement Currency. | Number | | | Organization | X | X | | | |
| 44 | Total Sales | The amount of the total sales/revenues of the consolidated group in Financial Statement Currency. | Number | | | Organisation | X | X | | | |
| 45 | Total Income | Total income of the borrower in USD. | Number | | | Customer | | | | | |
| 46 | Total Income Source Code | The code for the source reporting total income for the customer. | Text | Classification | | Customer | | | | | |
| 47 | Total Income reporting date | The date total income was reported/recorded for the customer. As provided by the source reporting total income. | Date | | | Customer | | | | | |
| 48 | Total Income Range Code | The income range of the customer in USD | Number | Classification | | Customer | | X | | | |

FIGURE 2B

| # | Field Name | Data Definition | Data Type | Reference Data Lookup | History | Pertains To | Mandatory | Required For ||||| |
|---|---|---|---|---|---|---|---|---|---|---|---|---|
| | | | | | | | | Basel | CQB | OFSA | ALM | DA | Economic Capital |
| 1 | Reporting Date | Calendar date which defines the end of the time period to which this data applies. For a month-end extract, this date would be set to the last day in the month and the values supplied in the fields below would be current as-of that date. | Date | | | | | | | | | | |
| 2 | Party ID | Unique identifier of the Related Party to whom these rating corresponds to. This field along with Rating source system ID and Rating date makes a record unique in the SIF | Text | | | | | | | | | | |
| 3 | Rating Source System ID | The Source System ID which assigns the PD rating to the Related Party | Text | Y | | | | | | | | | |
| 4 | Final PD Rating | The final probability of Default rating value assigned to the Related Party. This is the PD that will be passed to Power 1 from CCM and CATS.Possible values for PD are from 1-16 | Text | | | | | | | | | | |
| 5 | Final PD Rating Date | The date in which the Final PD rating is assigned to the Related Party | Date | | | | | | | | | | |
| 6 | Behavior Score | The behavioral score value assigned to the Related Party by CATS.This field will populated only for CATS and not for CCM | Text | Y | | | | | | | | | |
| 7 | PD Model ID | Unique identifier of the model that is used for calculating the Pd of the Related Party | Text | Y | | | | | | | | | |
| 8 | PD Model Version Number | The version number corresponding to the PD Model that is been used for calculating the Related Party PD | Number | | | | | | | | | | |
| | PD Based on Borrower Details and Rating | | | | | | | | | | | | |
| 9 | Fitch Rating | External credit assessment rating of the Related Party assigned by external credit agency Fitch.( Sample Values are 387-AAA388- AA+,389-AA) | Text | | | | | | | | | | |
| 10 | Fitch Type of Debt Code | The type of debt associated with the fitch rating of the Related Party (Sample Values are SECURED,SUBORDINATED,PREFERRED STOCK) | Number | Classification | | | | | | | | | |
| 11 | Fitch Senior Unsecured Debt Rating | External credit assessment rating of the Related Party's most senior unsecured debt assigned by external credit agency Fitch.This field will not be populated when the Type of Debt Code is not Senior Unsecured | Text | | | | | | | | | | |
| 12 | Fitch Watch status Indicator | The indicator that identifies whether the Related Party credit status is on watch by Fitch rating agency.( Y - yes, N - No) | Flag | | | | | | | | | | |

FIGURE 3A

| # | Field Name | Data Definition | Data Type | Reference Data Lookup | History | Pertains To | Mandatory | Basel | CQB | OFSA | ALM | DA | Economic Capital |
|---|---|---|---|---|---|---|---|---|---|---|---|---|---|
| 13 | Fitch Rating Date | The date associated with the Fitch Rating of the Related Party | Date | | | | | | | | | | |
| 14 | Moodys Rating | External credit assessment rating of the Related Party assigned by external credit agency Moodys. Sample Values (284 – Aaa, 285-Aa1, 286-Aa2, 287-Aa3) | Text | | | | | | | | | | |
| 15 | Moodys Type of Debt Code | The type of debt associated with the Moodys rating of the Related Party. (Sample Values are SECURED, SUBORDINATED, PREFERRED STOCK) | Number | Classification | | | | | | | | | |
| 16 | Moodys Senior Unsecured Debt Rating | External credit assessment rating of the Related Party's most senior unsecured debt assigned by external credit agency Moody. This field will not be populated when the Type of Debt Code is Senior Unsecured | Text | | | | | | | | | | |
| 17 | Moodys Watch status Indicator | The indicator that identifies whether the Related Party credit status is on watch by Moodys rating agency( Y - yes, N - No) | Flag | | | | | | | | | | |
| 18 | Moodys Rating Date | The date associated with the Moodys Rating of the Related Party | Date | | | | | | | | | | |
| 19 | S&P Rating | External credit assessment rating of the Related Party assigned by external credit agency S&P ( Sample Values are 339-AAA, 340-AA+, 341-AA) | Text | | | | | | | | | | |
| 20 | S&P Type of Debt Code | The type of debt associated with the S&P rating of the Related Party. (Sample Values are SECURED, SUBORDINATED, PREFERRED STOCK) | Number | Classification | | | | | | | | | |
| 21 | S&P Senior Unsecured Debt Rating | External credit assessment rating of the Related Party's most senior unsecured debt assigned by external credit agency S&P. This field will not be populated when the Type of Debt Code is Senior Unsecured | Text | | | | | | | | | | |
| 22 | S&P Watch status Indicator | The indicator that identifies whether the Related Party credit status is on watch by S&P rating agency( Y - yes, N - No) | Flag | | | | | | | | | | |
| 23 | S&P Rating Date | The date associated with the S&P Rating of the Related Party | Date | | | | | | | | | | |
| 24 | AM Best Rating | External credit assessment rating of the Related Party assigned by external credit agency AM Best. AM Best will assign rating for Related Partys in insurance segment | Text | | | | | | | | | | |

FIGURE 3B

| # | Field Name | Data Definition | Data Type | Reference Data Lookup | History | Pertains To | Mandatory | Basel | CQB | OFSA | ALM | DA | Economic Capital |
|---|---|---|---|---|---|---|---|---|---|---|---|---|---|
| 25 | Fitch Small Bank Rating | External credit assesment rating assigned by Fitch. This rating will be populated only for PD Model - Financial Institutions | Text | | | | | | | | | | |
| 26 | Fitch International Bank Rating | External credit assesment rating assigned by Fitch. This rating will be populated only for PD Model - Financial Institutions | Text | | | | | | | | | | |
| 27 | Primary CB Score | The external credit bureau score of the Related Party as per Primary Credit Bureau. These Scores are populated only for PD Model - Individuals | Text | Y | | | | | | | | | |
| 28 | Secondard CB Score | The external credit bureau score of the Related Party as per Secondary Credit Bureau. These Scores are populated only for PD Model - Individuals | Text | Y | | | | | | | | | |
| 29 | Tertiary CB Score | The external credit bureau score of the Related Party as per Tertiary Credit Bureau. These Scores are populated only for PD Model - Individuals | Text | Y | | | | | | | | | |
| 30 | Quaternary CB Score | The external credit bureau score of the Related Party as per Primary Credit Bureau. These Scores are populated only for PD Model - Individuals | Text | Y | | | | | | | | | |
| 31 | Post Agency Rating PD Rating | The probability of Default rating value assigned to the Related Party by the model based on rating information from external credit rating agencies | Text | | | | | | | | | | |
| 32 | Post Validation PD Rating | The probability of Default rating value assigned to the Related Party by the model based on validation of rating information from external credit rating agencies. This will be populated only for PD Model - Financial Institutions | Text | | | | | | | | | | |
| 33 | Post Borrower Info PD Rating | The probability of Default rating value assigned to the Related Party by the model following the capture of Financial or Non Financial Information about the borrower | Text | | | | | | | | | | |
| | PD Based on EDF | | | | | | | | | | | | |
| 34 | KMV EDF Indicator | The indicator that identifies whether the KMV EDF is available for the Related Party. ( Y - Available. , N - Not Available ) | Text | | | | | | | | | | |
| 35 | KMV EDF | Expected Default Frequency is a measure of the probability that a firm will default over a specified period of time. Possible values are from 0.0 to 35.0 | Number | | | | | | | | | | |

FIGURE 3C

| # | Field Name | Data Definition | Data Type | Reference Data Lookup | History | Pertains To | Mandatory | Basel | CQB | OFSA | ALM | DA | Economic Capital |
|---|---|---|---|---|---|---|---|---|---|---|---|---|---|
| 36 | KMV EDF for PD Indicator | The indicator that identifies whether the KMV EDF is incorporated for PD calculation. ( Y - Yes , N - No) | Flag | | | | | | | | | | |
| 37 | RISKCALC EDF Indicator | The indicator that identifies whether the RISK CALC EDF is available for the Related Party. ( Y - Flag Available , N - Not Available ) | Flag | | | | | | | | | | |
| 38 | RISKCALC EDF | Expected Default Frequency is a measure of the probability that a firm will default over a specified period of time. Possible values are from 0 to 100. RISK CALC EDF for General Industries will be populated when KMV EDF is not available | Number | | | | | | | | | | |
| 39 | RISKCALC EDF for PD Indicator | The indicator that identifies whether the RISK CALC EDF is incorporated for PD calculation. ( Y Yes, N - No) | Flag | | | | | | | | | | |
| 40 | Adjusted PD Rating | The probability of Default rating value assigned to the Related Party by the model based on KMV EDF and / or Risk Calc EDF. This will be populated only for PD Model General Industries Risk Calc | Text | | | | | | | | | | |
| 41 | Post KMV EDF PD Rating | The probability of Default rating value assigned to the Related Party by the model based on additional information from KMV EDF. | Text | | | | | | | | | | |
| | PD Based on Warning Signals | | | | | | | | | | | | |
| 42 | Number of Warning Signals | Number of Warning Signals selected while assigning PD Rating to the Related Party | Text | | | | | | | | | | |
| 43 | Negative Adjusttment Due to Warning Signals | The Negative adjustment if any applied to the Calculated PD Rating of the Related Party | Number | | | | | | | | | | |
| 44 | Post Warning Signals PD Rating | The probability of Default rating value assigned to the Related Party by the model updated based on adjustment to rating information from external credit rating agencies | Text | | | | | | | | | | |
| | Override PD | | | | | | | | | | | | |
| 45 | Overridden PD Rating | The probability of Default rating value assigned to the Related Party by the user that overrides the calculated PD | Text | | | | | | | | | | |
| 46 | Criticized Borrower PD Rating | The probability of Default rating value assigned to the worst rated Related Party( 12 or Worse PD rating) by the user.Criticized Borrower PD Rating will be in range of 12 to 16 | Text | | | | | | | | | | |
| 47 | Party Source System ID | The Source System to which the Related Party belongs to. | Text | Y | | | | | | | | | |

FIGURE 3D

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 1 | Reporting Date | Calendar date which defines the end of the time period to which this data applies | Date | | | | | X | X | X | X | X | X | X | System Information |
| *Attributes for Identification & Traceability* | | | | | | | | | | | | | | | |
| 2 | Source System ID | Source System to which the account belongs | Text | | None | Installment Loans | | X | X | X | X | X | X | X | System Information |
| 3 | Account ID | Unique Identifier of each account | Text | | None | Installment Loans | | X | X | X | X | X | X | X | System Information |
| 4 | Bank Number | The bank number currently assigned to the account | Text | Lookup | None | Installment Loans | | X | X | X | X | X | X | X | PNC Reference Information |
| 5 | Assigned Branch | The branch number currently assigned to the account. A user defined code that indicates the loan's originating branch office. | Text | Lookup | None | Installment Loans | | X | X | X | X | NR | NR | X | PNC Reference Information |
| *Common Attributes for Installment Loans* | | | | | | | | | | | | | | | |
| 6 | Account Lifecycle Status | The current lifecycle status of the account. Based on Ref Data 'Account Lifecycle Status '.( Open, Closed) | Text | Classification | Full | Installment Loans | | X | X | X | X | NR | NR | X | Account Information |
| 7 | Account Lifecycle Status Change Date | The date on which the account lifecycle status got changed | Date | | Full | Installment Loans | | X | X | X | X | NR | NR | X | Account Information |
| 8 | Account Lifecycle Status Change Reason Code | The reason code for change in account lifecycle status. Domain Values can be 'closed by consumer', 'closed in the reissue process'. | Text | Classification | Full | Installment Loans | | X | X | X | X | NR | NR | X | Account Information |
| 9 | Account Credit Status | The current credit status of the account. Based on Ref Data 'Account Credit Status '.( Charged-off, Bankrupt, Delinquent) | Text | Classification | Full | Installment Loans | | X | X | X | X | NR | NR | X | Account Information |
| 10 | Account Credit Status Change Date | The date on which the account credit status got changed | Date | | Full | Installment Loans | | X | X | X | X | NR | NR | X | Account Information |
| 11 | Account Credit Status Change Reason Code | The reason code for change in account credit status | Text | Classification | Full | Installment Loans | | X | X | X | X | NR | NR | X | Account Information |
| 12 | Account Category Type Code | The category to which the installment loan account belongs to. Example - Direct Loan, Indirect Loan etc. | Number | Classification | Periodic | Installment Loans | | X | X | X | X | X | X | X | Account Information |
| 13 | Account Type Code | This code represents the type of account from a particular source system. Example - Auto Loans, Personal Secured Loans, Personal Unsecured Loans etc. | Number | Classification | Periodic | Installment Loans | | X | X | X | X | X | X | X | Account Information |

FIGURE 4A

| # | Field Name | Data Definition | Data Type | Reference Data Lookup | History | Pertains To | Cardinality | Required for | | | | | | | Business Categorization |
|---|---|---|---|---|---|---|---|---|---|---|---|---|---|---|---|
| | | | | | | | | Basel | Credit Risk Book | NCC DW | ALM | Fin. Reporting | Economic Capital | Distressed Assets | |
| 14 | Product Line Code | The product line code (lowest level product code) of the account. Based on Ref Data "Product Line Code." Some Credit Cards become Installment Loans, will drop out of this SIF. Will account number change? (Partitions) | Text | | Periodic | Installment Loans | | X | | X | X | | X | X | Account Information |
| 15 | Internal Credit Score | The Credit Score assigned to the account internally by the bank as of period to date | Text | | Profile | Installment Loans | 1 : M | X | X | X | X | X | NR | X | Account Information |
| 16 | Internal Credit Scoring Date | The date on which the credit score was generated | Date | | Profile | Installment Loans | 1 : M | X | X | X | X | X | NR | X | Account Information |
| 17 | Internal Credit Scorecard ID | The version / ID of the scorecard used for internal credit scoring | Text | Classification | Profile | Installment Loans | 1 : M | X | X | X | X | X | NR | X | Account Information |
| 18 | Borrower Credit Bureau ID | Unique identification of the credit bureau which assigned credit score to the borrower | Text | Classification | Profile | Installment Loans | 1 : M | X | X | X | X | X | NR | X | Account Information |
| 19 | Borrower Credit Bureau Original Score | The Credit Score assigned to the borrower by the external credit bureau as of loan origination date | Text | | None | Installment Loans | | X | X | X | X | X | NR | X | Account Information |
| 20 | Borrower Credit Bureau Score | The Credit Score assigned to the borrower by the external credit bureau as of period to date | Text | | Profile | Installment Loans | 1 : M | X | X | X | X | X | NR | X | Account Information |
| 21 | Borrower Credit Bureau Scoring Date | The date on which the credit score was assigned to the borrower | Date | | Profile | Installment Loans | 1 : M | X | X | X | X | X | NR | X | Account Information |
| 22 | NPA Flag | Flag to indicate whether the account is performing or not performing | Flag | | Profile | Installment Loans | | X | X | X | X | NR | NR | X | Account Information |
| 23 | Securitized Flag | Flag to indicate whether the asset is securitized | Flag | | Profile | Installment Loans | | X | X | NR | X | NR | NR | X | Account Information |
| 24 | Securitized Amount | The securitized portion of the outstanding amount. ( Mandatory only when Securitized Flag = Y) | Number | | Profile | Installment Loans | | X | X | NR | X | NR | NR | X | Account Servicing and Financial Information |
| 25 | Securitization Pool ID | The Pool identifier to which the securitized account belongs to ( Mandatory only when Securitized Flag = Y) | Text | | Periodic | Installment Loans | | X | X | NR | X | NR | NR | X | Account Information |
| 26 | Account Open Date | The date in which the account was opened in the system | Date | | None | Installment Loans | | X | X | X | X | X | NR | X | Account Information |
| 27 | Account Maturity Date | The date by which the account expires / matures. The last date by which all outstanding payments have to be made. | Date | | Profile | Installment Loans | | X | X | X | X | NR | NR | X | Account Information |
| 28 | Account Recourse Type | The code to indicate the type of recourse applicable on the account(0=No, 1=recourse, 2=limited recourse, 3=repurchase) | Text | Classification | Periodic | Installment Loans | | X | X | NR | NR | NR | NR | X | Delinquency, Charge-off and Recovery Information |

FIGURE 4B

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 29 | Recourse Expiration Date | The expiration date of the recourse requirement. | Date | | Periodic | Installment Loans | | NR | NR | NR | NR | NR | NR | X | Delinquency, Charge-off and Recovery Information |
| 30 | LTV | Total combined percent of the loan amount to the value of all collateral securing the installment loan | Ratio | | Periodic | Installment Loans | | X | X | NR | NR | NR | NR | NR | Servicing and Financial Information |
| 31 | Billing Frequency | Monthly /Semi Monthly/Quarterly/Yearly | Text | Classification | Periodic | Installment Loans | | X | X | NR | X | NR | NR | X | Account Information |
| 32 | Billing Method Code | The method used to remit the payment. 0 = No billing, 1 = Coupons, 4 = Bills, 6 = Drafting, 7 = Monthly Billing, 8 = Billing and Receipt, 9 = Bill and Receipt/Late Charges | Text | Classification | Periodic | Installment Loans | | NR | NR | X | NR | NR | NR | X | Account Information |
| 33 | Original Currency | The currency of the account in which the loan has been issued | Text | | None | Installment Loans | | X | X | X | X | NR | NR | X | Account Information |
| 34 | Interest Rate Type | Fixed or Adjustable | Text | Classification | Periodic | Installment Loans | | NR | X | X | X | NR | NR | NR | Account Information |
| 35 | Loan Acquisition Code | A code that indicates how the loan was acquired. (1 = Originated, 2 = Acquired thru Purchase, 3 = Acquired thru Servicing Transfer) | Text | Classification | None | Installment Loans | | NR | NR | X | NR | NR | NR | X | Account Information |
| 36 | Loan Tenor | The amount of time left for the loan | Number | | Periodic | Installment Loans | | X | X | X | X | X | X | X | Account Information |
| | *Common Attributes for Installment Loans - Specific attributes for adjustable / variable rate products* | | | | | | | | | | | | | | |
| 37 | Current Interest Rate | Interest Rate applicable to the account as of reporting date | Perc | | Periodic | Variable Installment Loans | | X | X | X | X | NR | NR | NR | Account Information |
| 38 | Next Interest Rate Reset Date | Date of the next interest rate adjustment (required if interest rate type is adjustable) | Date | | Periodic | Variable Installment Loans | | NR | NR | X | X | X | X | NR | Account Information |
| 39 | Reference Interest Rate | The benchmark interest rate index used to calculate the interest rate for products having variable interest rate | Text | Classification | None | Variable Installment Loans | | NR | NR | X | X | X | X | NR | Account Information |

FIGURE 4C

| # | Field Name | Data Definition | Data Type | Reference Data Lookup | History | Pertains To | Cardinality | Required for | | | | | | | Business Categorization |
|---|---|---|---|---|---|---|---|---|---|---|---|---|---|---|---|
| | | | | | | | | Basel | Credit Risk Book | NCC DW | ALM | Fin. Reporting | Economic Capital | Distressed Assets | |
| 40 | Adjustment Indicator | Designates how the base rate is to be adjusted by the adjustment rate. Blank=no adjustment applies. P=positively, N=negatively, I=multiply by the adjustment rate and add the result to the base, D=multiply by the adjustment rate subtract the result from the base, X =change VIR rate if new rate is .0025 more than pervious rate, Y=change VIR rate if new rate is .0025 less than previous rate | Text | Classification | None | Variable Installment Loans | | NR | NR | X | X | X | X | NR | Account Information |
| 41 | Adjustment Factor | The base rate variance adjustment factor used at the account level to develop the effective interest rate. This adjustment factor can be either positive or negative. The interest rate is base rate +/- vir base variance +/- customer discount. Expressed as a decimal, .02000=2% | Ratio | | Periodic | Variable Installment Loans | | NR | NR | X | X | X | X | NR | Account Information |
| 42 | Interest Rate Life Cap | The maximum interest rate allowed over the life of the variable rate product | Perc | | None | Variable Installment Loans | | NR | NR | NR | X | NR | X | NR | Account Information |
| 43 | Interest Rate Life Floor | The minimum interest rate allowed over the life of the variable rate product | Perc | | None | Variable Installment Loans | | NR | NR | NR | X | NR | X | NR | Account Information |
| 44 | Interest Rate Periodic Cap | The maximum interest rate allowed over the reset interval of the variable rate product | Perc | | None | Variable Installment Loans | | NR | NR | NR | X | NR | X | NR | Account Information |
| 45 | Interest Rate Periodic Floor | The minimum interest rate allowed over the reset interval of the variable rate product | Perc | | None | Variable Installment Loans | | NR | NR | NR | X | NR | X | NR | Account Information |
| 46 | Interest Rate Reset Interval | The interval between rate adjustments | Number | Classification | None | Variable Installment Loans | | NR | NR | NR | X | NR | X | NR | Account Information |
| 47 | Interest Rate Life Increase | Maximum interest rate increase allowed during the life of an adjustable rate instrument | Perc | | None | Variable Installment Loans | | NR | NR | NR | X | NR | X | NR | Account Information |
| 48 | Interest Rate Life Decrease | Maximum interest rate decrease allowed during the life of an adjustable rate instrument | Perc | | None | Variable Installment Loans | | NR | NR | NR | X | NR | X | NR | Account Information |

FIGURE 4D

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 49 | VIR Payment Recalculation Code | indicates under what conditions variable rate loans are to have their payment amounts recalculated. D 0=do not recalc payment, 1=recalc when in acct rate changes, 2=recalc xxx months from note date, 3=recalc xxx months from note date using the average of the last four rates. | Text | Classification | Periodic | Variable Installment Loans | | NR | NR | X | NR | NR | NR | X | Account Information |

Common Attributes for Installments Accounts - Specific attributes for:

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 50 | Interest paid | The Interest amount paid to the account (period to date) | Number | | Periodic | Installment Loans | | X | NR | NR | NR | NR | NR | X | Servicing and Financial Information |
| 51 | Interest billed | The Interest amount billed to the account (period to date) | Number | | Periodic | Installment Loans | | X | NR | NR | NR | NR | NR | X | Servicing and Financial Information |
| 52 | Fees paid | The fee amount paid to the account (period to date). Includes all types of fees | Number | | Periodic | Installment Loans | | X | NR | NR | NR | NR | NR | X | Servicing and Financial Information |
| 53 | Fees billed | The fee amount billed to the account (period to date) | Number | | Periodic | Installment Loans | | X | NR | NR | NR | NR | NR | X | Servicing and Financial Information |
| 54 | Unpaid Fees | The unpaid amount of all the fees to the account | Number | | Periodic | Installment Loans | | X | X | X | X | X | X | X | Servicing and Financial Information |
| 55 | Accrued Interest | The unpaid/accrued interest amount against the account (period to date) | Number | | Periodic | Installment Loans | | X | X | X | X | X | NR | X | Servicing and Financial Information |
| 56 | Accrued Interest Calendar basis | Day Count Convention that is used to accrue interest. (e.g. Act/360, Act/365) | Text | Classification | Periodic | Installment Loans | | NR | NR | NR | X | NR | NR | X | Account Information |
| 57 | Interest Compounding Frequency | The frequency at which interest is compounded | Text | Classification | Periodic | Installment Loans | | NR | NR | NR | X | NR | NR | X | Account Information |
| 58 | Total Loan Amount | The total contractual loan amount of the account | Number | | Periodic | Installment Loans | | X | X | X | X | X | X | X | Origination Information |
| 59 | Down Payment | The amount paid as a down payment | Number | | None | Installment Loans | | NR | NR | X | NR | NR | NR | X | Origination Information |
| 60 | Total Payment Due | The payment/installment due amount of the account as of reporting date | Number | | Full | Installment Loans | | X | X | X | X | X | X | X | Servicing and Financial Information |
| 61 | Outstanding Principal Balance | The total amount of principal that the borrower owes on the installment loan (sum of principal amount across all remaining payments) | Number | | Full | Installment Loans | | NR | NR | X | NR | NR | NR | X | Servicing and Financial Information |
| 62 | Current Contractual Payment Amount | The current principal and interest payment which is to be paid in installments | Number | | Periodic | Installment Loans | | X | X | X | X | X | X | X | Servicing and Financial Information |

FIGURE 4E

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 63 | Amortization Type | A code that determines how payments are amortized.(1 = Constant P&I,2 = Constant principal, 5 = Buy down/subsidy loan,8 = Combination of GPM) | Text | Classification | Periodic | Installment Loans | | | | | | | | X | Account Information |
| 64 | First Disbursement Date | The date in which the amount is been disbursed for the first time to the applicant | Date | | None | Installment Loans | | NR | | X | X | X | NR | X | Account Information |
| 65 | Total Disbursed Amount | The total loan amount disbursed to the customer till date | Number | | Periodic | Installment Loans | | X | X | X | X | NR | X | X | Origination Information |
| 66 | Principal paid YTD | The total of all principal payments made during the current year (year to date). | Number | | Periodic | Installment Loans | | NR | NR | NR | NR | NR | NR | X | Servicing and Financial Information |
| 67 | Interest paid YTD | The total of all interest payments made during the current year (year to date). | Number | | Periodic | Installment Loans | | NR | NR | NR | X | X | NR | X | Servicing and Financial Information |
| 68 | Next Payment Due Date | The date the next payment is due to the account | Date | | Periodic | Installment Loans | | NR | NR | NR | X | X | NR | X | Servicing and Financial Information |
| 69 | Last Payment Date | The date the last payment was made to the account | Date | | Periodic | Installment Loans | | NR | X | NR | NR | NR | NR | X | Servicing and Financial Information |
| 70 | Last Payment Amount | The amount of the recent payment made to the account | Number | | Full | Installment Loans | | NR | NR | X | NR | NR | NR | X | Servicing and Financial Information |
| 71 | Number of Payments Made | Total number of payments made as of reporting date | Number | | Full | Installment Loans | | NR | NR | X | NR | NR | X | X | Servicing and Financial Information |
| 72 | Late Charge Method | The code that specifies the late charge method to be used. Late charge method, 1=percent, 2=fixed fee, 3=both. | Text | Classification | Periodic | Installment Loans | | NR | NR | X | NR | NR | NR | X | Account Information |
| 73 | Late Charge Option | The code indicates the late charge option applicable to the account 0 = no late charges assessed 1 = late charges are assessed if any payment is past due (non-UCCC). 2 = late charges are assessed only if a payment has not been received within the BCR grace period (UCCC). The field defined as payments in late charge grace period is the accumulation of those payments. | Text | Classification | Periodic | Installment Loans | | NR | NR | X | NR | NR | NR | X | Account Information |
| 74 | Last Late Charge date | Date that corresponds with Last Late Charge Assessed. | Date | | Periodic | Installment Loans | | NR | NR | X | NR | NR | NR | X | Servicing and Financial Information |

FIGURE 4F

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 75 | Late Charge Due | The amount of late charge fee due on the account | Number | | Periodic | Installment Loans | | NR | NR | X | NR | NR | NR | X | Servicing and Financial Information |
| 76 | Late Charge collected YTD | The amount of late fee collected in the current year (year to date). | Number | | Periodic | Installment Loans | | NR | NR | X | NR | NR | NR | X | Servicing and Financial Information |
| 77 | Loan Record Code | This is the primary code that determines a loan is simple interest or add-on. (0 = add-on loan, 1 = simple interest loan ) | Number | Classification | Periodic | Installment Loans | | NR | NR | X | NR | NR | X | X | Account Information |
| 78 | Payment Extension Applied Date | The date of last extension applied to the account | Date | | Full | Installment Loans | | NR | NR | X | NR | NR | X | X | Servicing and Financial Information |
| 79 | Extension fees Assessed | The amount of extension fees assessed for the account | Number | | Periodic | Installment Loans | | NR | NR | X | NR | NR | X | X | Servicing and Financial Information |
| 80 | Fee Export Flag | Indicates if the fees for this loan are exported to another bank. | Flag | | Periodic | Installment Loans | | NR | NR | X | NR | NR | X | X | Account Information |
| *Attributes for Delinquency data* | | | | | | | | | | | | | | | |
| 81 | Days Past Due | The number of days past due from the last payment due date | Number | | Full | Installment Loans | | X | X | X | X | X | X | X | Delinquency, Charge-off and Recovery Information |
| 82 | Delinquency Start Date | Date of the first day the account becomes delinquent. ( Mandatory only when days past due >= 1 day ) | Date | | Full | Installment Loans | | X | X | X | X | X | X | X | Delinquency, Charge-off and Recovery Information |
| 83 | Number of Cycles Delinquent | Number of cycles currently delinquent | Number | | Full | Installment Loans | | NR | X | NR | NR | NR | NR | X | Delinquency, Charge-off and Recovery Information |
| 84 | Amount Delinquent | The total delinquent amount of the account | Number | | Full | Installment Loans | | X | X | X | NR | NR | X | X | Delinquency, Charge-off and Recovery Information |
| 85 | 1 cycle delinquent count | The number of times that the account has been 1 cycle delinquent | Number | | Periodic | Installment Loans | | NR | X | X | NR | NR | NR | X | Delinquency, Charge-off and Recovery Information |
| 86 | 2 cycle delinquent count | The number of times that the account has been 2 cycle delinquent | Number | | Periodic | Installment Loans | | NR | X | NR | NR | NR | NR | X | Delinquency, Charge-off and Recovery Information |
| 87 | 3 cycle delinquent count | The number of times that the account has been 3 cycle delinquent | Number | | Periodic | Installment Loans | | NR | X | NR | NR | NR | NR | X | Delinquency, Charge-off and Recovery Information |

FIGURE 4G

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 88 | 4 cycle delinquent count | The number of times that the account has been 4 cycle delinquent | Number | | Periodic | Installment Loans | | NR | X | NR | NR | NR | NR | X | Delinquency, Charge-off and Recovery Information |
| 89 | 5 cycle delinquent count | The number of times that the account has been 5 cycle delinquent | Number | | Periodic | Installment Loans | | NR | X | NR | NR | NR | NR | X | Delinquency, Charge-off and Recovery Information |
| 90 | 6 cycle delinquent count | The number of times that the account has been 6 cycle delinquent | Number | | Periodic | Installment Loans | | NR | X | NR | NR | X | NR | X | Delinquency, Charge-off and Recovery Information |
| *Attributes related to loan origination* | | | | | | | | | | | | | | | |
| 91 | Loan Application Number | The loan application number for the Loan | Text | | None | Installment Loans | | NR | NR | X | NR | NR | X | X | Origination Information |
| 92 | Override Code number | Indicates if the credit score was overridden. Blank or 00 = No; credit score was not overridden. 01-99 = Yes; credit score was overridden. | Text | | None | Installment Loans | | NR | NR | X | NR | NR | NR | X | Origination Information |
| 93 | Approving Officer Number | Number identifying the loan officer who approved the loan. | Text | | None | Installment Loans | | NR | NR | X | NR | NR | NR | X | Origination Information |
| 94 | Current Primary Officer Number | Number identifying the loan officer currently assigned to the loan. | Text | | Periodic | Installment Loans | | NR | NR | X | NR | NR | NR | X | Origination Information |
| 95 | Original Maturity Date | Date loan was originally due to mature | Date | | None | Installment Loans | | NR | X | X | NR | NR | X | X | Origination Information |
| 96 | Original Contractual Payment Amount | The original principal and interest payment amount (periodic installment amount) when the loan is set up. | Number | | None | Installment Loans | | NR | NR | X | NR | NR | NR | X | Origination Information |
| 97 | Original LTV | The percentage of the Loan amount to the collateral securing the loan when the loan in setup | Ratio | | None | Secured Loans | | NR | X | NR | NR | NR | X | X | Origination Information |
| 98 | Original Number Payment | Number of payments as per original payment schedule. | Number | | None | Installment Loans | | NR | NR | X | NR | NR | X | X | Origination Information |
| 99 | Original Interest Rate | Interest Rate applicable to the account as of account open date | Perc | | None | Installment Loans | | X | X | X | X | NR | NR | NR | Origination Information |
| *Attributes related to prepayments* | | | | | | | | | | | | | | | |
| 100 | Prepayment Penalty Amount | Pre-payment penalty amount - the amount of prepayment penalty the system will charge on loan. | Number | | Periodic | Installment Loans | | NR | NR | X | NR | NR | NR | X | Servicing and Financial Information |

FIGURE 4H

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 101 | Prepayment Penalty Type | Code indicating type of prepayment penalty calculation in effect for this loan; if not entered, bank edits will default all prepayment penalty fields. 0 - No Penalty 1 - percentage of current balance (no minimum or maximum) 2 - Flat fee 3 - percentage of current balance with maximum 4 - percentage of current balance with minimum 5 - percentage of current balance with minimum and maximum | Text | Classification | Periodic | Installment Loans | | NR | NR | X | NR | NR | NR | X | Servicing and Financial Information |
| 102 | Prepayment Penalty Percent | The percentage of the current loan balance the system uses to calculate the prepayment penalty. | Perc | | Periodic | Installment Loans | | NR | NR | X | NR | NR | NR | X | Servicing and Financial Information |
| 103 | Prepayment Penalty Term | Number of months after the advance date that the loan is eligible for prepayment penalty assessment. | Number | | Periodic | Installment Loans | | NR | NR | X | NR | NR | NR | X | Servicing and Financial Information |
| 104 | Prepayment Penalty Max Amount | The maximum pre-payment penalty amount that will be charged if the loan pays off early. | Number | | Periodic | Installment Loans | | NR | NR | X | NR | NR | NR | X | Servicing and Financial Information |
| 105 | Prepayment Penalty Min Amount | The minimum pre-payment penalty amount that will be charged if the loan pays off early. | Number | | Periodic | Installment Loans | | NR | NR | X | NR | NR | NR | X | Servicing and Financial Information |
| 106 | Prepayment Amount | The current month pay off amount | Number | | Periodic | Installment Loans | | NR | NR | X | NR | NR | NR | X | Servicing and Financial Information |
| 107 | Balance Lock Percentage | Represents a "lock-out" upon further prepayments. Once the outstanding principal reaches this level, no further prepayments will be computed | Perc | | Periodic | Installment Loans | | NR | NR | X | NR | NR | NR | X | Servicing and Financial Information |
| *Attributes for Student Loans* | | | | | | | | | | | | | | | |
| 108 | School ID | An ED (US Department of Education) School Identification specifies a code used to identify a School assigned by the US Department of Education. | Text | Lookup | None | Student Loans | | NR | | X | NR | NR | NR | X | System Information |

FIGURE 4I

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 109 | Servicer ID | An ED (US Department of Education) Servicer Identification specifies a code used to identify a student loan servicing organization assigned by the US Department of Education. Usage: The servicer is responsible for processing the loan (making disbursements, processing payments, etc.) and provides account information to the lender. | Text | Lookup | None | Student Loans | | NR | NR | X | NR | NR | NR | X | System Information |
| Attributes for Leases | | | | | | | | | | | | | | | |
| 110 | Net Present Value | Net Present Value is the net present value of the total lease payments discounted at the contractual lease interest rate.(mandatory if product type is Lease) | Number | | Periodic | Leases | | X | X | X | X | X | X | X | Account Information |
| 111 | Residual Value | Residual value of the leased object according to the Leasing contract, in an Operating or equivalent Lease transaction.(mandatory if product type is Lease) | Number | | Periodic | Leases | | X | X | X | X | X | X | X | Account Information |
| 112 | Bargain Option Amount for Lease | The exercise price of the option to purchase the leased assets, of which the exercise is reasonably certain. This amount must be expressed in the currency of the Credit Facility Limit.(mandatory if product type is Lease) | Number | | Periodic | Leases | | X | NR | NR | NR | NR | NR | X | Account Information |
| 113 | Total Lease Cost Amount | The total lease cost amount is the cost base for the lease. This amount represents the lessor's costs in acquiring the equipment to be leased and is the depreciable cost. This amount is the base charge to the lessee. Total Lease Cost is computed in the source system as follows: Total Lease Cost equals Equipment Price minus (Down payment plus Trade-In) plus Sales Tax plus Federal Tax plus License and Title Fee plus Document Fees plus Other Acquisition Costs | Number | | Periodic | Leases | | NR | NR | X | NR | NR | NR | X | Account Information |
| Attributes related to Dealers | | | | | | | | | | | | | | | |
| 114 | Dealer ID | Unique identifier of the dealer | Text | | None | Auto loans and Leases | | NR | NR | X | X | NR | NR | X | Account Information |
| 115 | Dealer Name | Name of the dealer | Text | | None | Auto loans and Leases | | NR | NR | X | X | NR | NR | X | Account Information |

FIGURE 4J

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 116 | Dealer Reserve Earning Option | Dealer Reserve Earning Option. 0 = unused 1 = prepaid 2 = non-Prepaid simple interest notes will pass either Dealer Monthly Earnings or Dealer Daily Collected to the subsystem depending on BCR option. | Text | Classification | Periodic | Auto loans and Leases | | NR | NR | X | X | X | NR | X | Account Information |
| 117 | Dealer Month to Date earned | Total month-to-date dealer reserve earned for add-on loans. Month-to-date dealer reserve earned for both add-on and simple interest dealer reserve. | Number | | Periodic | Auto loans and Leases | | NR | NR | X | X | X | NR | X | Account Information |
| 118 | Dealer Reserve Percent | Balance Limit Percent. That percentage of the original balance that must be paid before the Hold Amount is released to the dealer. | Perc | | Periodic | Auto loans and Leases | | NR | NR | X | X | X | NR | X | Account Information |
| 119 | Dealer Reserve Amount | Balance limit before Recourse Amount is released. The amount the current balance must reach before the Hold Amount is released to dealer | Number | | Periodic | Auto loans and Leases | | NR | NR | X | X | X | NR | X | Account Information |
| 120 | Dealer Hold Amount | Amount of Original Dealer Unearned which is withheld until a bank-defined amount or percentage of the loan has been paid by the maker. | Number | | Periodic | Auto loans and Leases | | NR | NR | X | X | X | NR | X | Account Information |
| *Attributes for reconciliation & financial* | | | | | | | | | | | | | | | |
| 121 | GL Company ID | The business unit associated with the account. | Text | | Periodic | Installment Loans | | | | | | | | | |
| 122 | Principal GL Account ID | The General ledger Principal account ID to which the loan account posts to | Text | | Periodic | Installment Loans | | X | X | NR | X | X | NR | X | PNC Reference Information |
| 123 | GL Cost Center ID | A unique number assigned to a specific area within a legal entity and used for the booking and reporting of financial data (assets, liabilities, income and expense) and non-financial data (number of full time employees) | Text | | Periodic | Installment Loans | | X | X | NR | X | X | NR | X | PNC Reference Information |
| *Attributes related to charge-off* | | | | | | | | | | | | | | | |
| 124 | Charge off Amount | The charged off amount of the account | Number | | Periodic | Installment Loans | | X | X | X | X | X | X | X | Delinquency, Charge-off and Recovery Information |
| 125 | Charge off Date | The date the account was charged-off | Date | | Periodic | Installment Loans | | X | X | X | X | X | X | X | Delinquency, Charge-off and Recovery Information |
| *New Attributes related for Release 2.0* | | | | | | | | | | | | | | | |

FIGURE 4K

| # | Field Name | Data Definition | Data Type | Reference Data Lookup | History | Pertains To | Cardinality | Basel | Credit Risk Book | NCC DW | ALM | Fin. Reporting | Economic Capital | Distressed Assets | Business Categorization |
|---|---|---|---|---|---|---|---|---|---|---|---|---|---|---|---|
| 126 | Source System Account Life Cycle Status Code | The original value of lifecycle status code from source system. | Text | | None | Installment Loans | | | | | | | | | Account Information |
| 127 | Source System Account Type Code | The original code representing the type to account from a particular source system. | Text | | None | Installment Loans | | | | | | | | | Account Information |
| 128 | PNC Owned Percent | This is the percentage of Installment loan that is owned by PNC. Values for this attribute range from 0-100. The loan may be fully owned, partially owned or fully serviced. | Perc | | None | Installment Loans | | | | | | | | | Servicing and Financial Information |
| 129 | Bankruptcy Arrearage Principal Balance | This is the Principal balance amount resulting from a delinquent account that has gone through a Bankruptcy proceeding. This amount should be added to the Outstanding Principal balance to reconcile to the general ledger(only for ACLS). This amount is derived in EIP based on logic defined for the GL Reconciliation process | Number | | None | Installment Loans | | | | | | | | | Servicing and Financial Information |
| 130 | GL Source System ID | The source system identification code for General Ledger company, account and center | Text | | None | General Ledger | | | | | | | | | |
| 131 | Interest Rate Reset Interval Unit of Measure | The Unit of Measure associated with Interest Rate Reset Interval | Number | Classification | | | | | | | | | | | |

FIGURE 4L

| # | Business Category | Field Name | Data Definition | Data Type | Reference Data Lookup | History | Pertains To | Mandatory | Required For Basel | Credit Quality Book | OCC Reporting | NCC DW | ALM | Fin. Reporting | Economic Capital |
|---|---|---|---|---|---|---|---|---|---|---|---|---|---|---|---|
| 1 | Basic loan data | Reporting Date | Calendar date which defines the end of the time period to which this data applies. For a month-end extract, this date would be set to the last day in the month and the values supplied in the fields below would be current As-of that date. | Date | | | | Y | X | | | | X | X | X |
| 2 | Basic loan data | Loan ID | The Unique Identifier of Commercial Loan Account in a source system. | Text | | | | Y | X | X | X | X | X | X | X |
| 3 | Basic loan data | Loan Source System ID | Source System to which the Loan Account belongs to. This attribute with Loan Id will make each record unique in Commercial Loan SIF. | Text | Y | | | Y | X | X | X | X | X | | X |
| 4 | Basic loan data | Key Component Loan ID | The original Unique Identifier of Commercial Loan Account in a source system. Using this field, records in this SIF can be linked to Commercial Loan Syndication and participation SIF. | Text | | | | | | | | | | | |
| 5 | Basic loan data | Loan Lifecycle Status Code | The code representing the current life cycle status of the Loan as of reporting date. Sample values:<br>- Open<br>- Closed<br>- Renew<br>- Re-Opened<br>- Cancelled<br>- On Hold<br>- Frozen | Number | Classification | | | | | X | | X | | X | X |
| 6 | Basic loan data | Loan Lifecycle Status Change Date | The date on which the loan lifecycle status got changed from past status to the current status | Date | | | | | | | | X | | | X |
| 7 | Basic loan data | Note Date | This is date in which the amount is disbursed to the customer | Date | | | | | | | | | | | |
| 8 | Basic loan data | Loan Effective Date | This is the date on which the loan has become effective in the system | Date | | | | | | | | | | | |
| 9 | Basic loan data | Loan Open Date | This is the date on which the loan was booked in the system. | Date | | | | | X | | X | X | X | X | X |
| 10 | Basic loan data | Loan Maturity Date | The life of the loan or the amount of time the loan will remain in existence until the total outstanding amount is paid off . The expected end date of the loan. | Date | | | | | X | | X | X | X | X | X |

FIGURE 5A

| # | Business Category | Field Name | Data Definition | Data Type | Reference Data Lookup | History | Pertains To | Mandatory | Basel | Credit Quality Book | OCC Reporting | NCC DW | ALM | Fin. Reporting | Economic Capital |
|---|---|---|---|---|---|---|---|---|---|---|---|---|---|---|---|
| 11 | Basic loan data | Product Line Code | The product line code (lowest level product code) of the account. This is the lowest level of product hierarchy. The Product line code of the loan can be different from the product line code of the commitment | Number | Y | | | | x | x | x | x | | x | x |
| 12 | Basic loan data | Loan Origination Type Code | This is the code that will identify the origination structure of the loan. Sample Values are: Direct Deal Syndication Participation | Number | Classification | | | | | | | | | | |
| 13 | Basic loan data | Currency Code | The actual currency of the loan . The Outstanding Balance of the account in the SIF will always be reported in USD irrespective of the actual currency | Text | | | | | x | | | | | x | x |
| 14 | Basic loan data | Commitment ID | This Field along with the Source System ID used to link the Loan Account to the associated Commitment . This Field will be left blank in case of Standalone Loans. | Text | | | | | x | x | x | | | x | x |
| 15 | Basic loan data | Key Component Customer ID | The customer ID related to the Loan which is included in Loan ID and forms the record unique in SIF as well as is part of key which is used to integrate the Loan record with CIF. | Text | | | | | | | | | | | |
| 16 | Risk | Loan Credit Status Code | The code representing the current credit/financial status of the Loan as of reporting date. Sample values: Impaired Delinquent Charge Off Accrual Return To Accrual | Number | Classification | | | | | x | | x | | x | |
| 17 | Risk | Loan Credit Status Change Date | The date on which the account credit status got changed from past status to the current status | Date | | | | | | | | | x | | |
| 18 | Risk | Internal Credit Score | The Credit Score assigned to the loan account internally by the bank. | Text | Y | | | | | | x | | | x | x |

FIGURE 5B

| # | Business Category | Field Name | Data Definition | Data Type | Reference Data Lookup | History | Pertains To | Mandatory | Required For Basel | Credit Quality Book | OCC Reporting | NCC DW | ALM | Fin. Reporting | Economic Capital |
|---|---|---|---|---|---|---|---|---|---|---|---|---|---|---|---|
| 19 | Risk | Internal Credit Scoring Date | The date on which the credit score was assigned to the loan account. | Text | | | | | | | | | | | |
| 20 | Risk | Internal Credit Scorecard ID | The ID of the scorecard that is been used for internal credit scoring. | Text | Y | | | | | | | | | | |
| 21 | Risk | Loan Purpose Code | The code specifies the intended purpose that is associated with the loan. Few Sample values are: Vehicle Purchase Business Start-up Home Improvement Debt Consolidation Venture Capital | Number | Classification | | | | | | x | x | | x | x |
| 22 | Risk | Secured Flag | This flag to indicate whether account is secured or not by a credit protection. | Flag | | | | | | | | x | | | x |
| 23 | Risk | NPA Flag | Flag to indicate whether the account is performing or not performing | Flag | | | | | | x | | | | | |
| 24 | Collateral | Original LTV | The Loan to Value ratio at the time of Origination. OLTV is % of loan value to the value of an underlying asset at the time of origination. | Number | | | | | | | | | | x | |
| 25 | Collateral | Current LTV | The Loan to Value ratio as per Last Collateral Appraisal. | Number | | | | | | | | | | x | |
| 26 | Regulatory | Shared National Credit Flag | Flag to indicate whether the Loan is been shared by two or more US Banks with a global loan amount of 20,000,000 USD | Flag | | | | | | x | | | | | |
| 27 | Regulatory | FRB Class Code | Indicates the classification into which the obligation should fall on the reports monitored by the fed. This field will be used for Regulatory reporting | Number | Classification | | | | | | | | | x | |
| 28 | Business | Primary Officer ID | The officer number corresponding to the relationship manager associated with the loan account | Text | | | | | | | | | | x | x |
| 29 | Financial | GL Company ID | The Company code of the General Ledger account | Text | | | | | | | | | | x | |
| 30 | Financial | Principal GL Account ID | The general ledger account number against which the Outstanding Principal Balance of the loan account is posted. | Text | | | | | x | | | | x | x | |
| 31 | Financial | GL Cost Centre ID | The responsibility centre ID associated with the account. This is also the Profit center to which the account posts on the General Ledger. This is also referred as GL Cost Center ID | Text | | | | | | | x | | x | x | |
| 32 | Syndication | Agent ID | This is the identification of agent bank in a syndication deal where PNC is a member. This field will be populated only when PNC becomes of a member of a syndication deal and its not playing the role of an agent. | Text | | | | | | | | | | | |

FIGURE 5C

| # | Business Category | Field Name | Data Definition | Data Type | Reference Data Lookup | History | Pertains To | Mandatory | Required For | | | | | | |
|---|---|---|---|---|---|---|---|---|---|---|---|---|---|---|---|
| | | | | | | | | | Basel | Credit Quality Book | OCC Reporting | NCC DW | ALM | Fin. Reporting | Economic Capital |
| 33 | Syndication | Record Type Code | "The code corresponding to the record type of the Loan / Commitment<br><br>Few Sample values from ACBS are:<br>600 -Direct Credit<br>100 - Syndicated Customer<br>500 - Syndicated Agent<br>200 - Syndicated Member<br>700 - Part Sold<br>Note (From ACBS): If the Loan/commitment is Syndicated - record types 100 (syndicated customer) and 200 (syndicated member) will be in the Participation/Syndication SIF; the 500 (syndicated agent) record will be in the Commercial Loan/Commitment SIF. For a non syndicated loan/commitment, there will be a record type 600 (Direct Credit) in the Commercial Loan/Commitment SIF. If a syndicated or non syndicated loan/commitment has parts sold, there will be record types 700 (Part Sold) in the Participation/Syndication SIF. | Number | Classification | | | | | | | | | | |

FIGURE 5D

| # | Business Category | Field Name | Data Definition | Data Type | Reference Data Lookup | History | Pertains To | Mandatory | Required For - Basel | Credit Quality Book | OCC Reporting | NCC DW | ALM | Fin. Reporting | Economic Capital |
|---|---|---|---|---|---|---|---|---|---|---|---|---|---|---|---|
| 34 | Balances | Original Loan Amount | The amount of money lend by the bank to the borrower. This will be same as total disbursed amount to the borrower or take down amount from the commitment | Number | | | | | | | | x | x | x | x |
| 35 | Balances | Current Outstanding Principal Balance Amount | The remaining Principal amount which the borrower owes to pay against the loan account as of reporting date | Number | | | | | x | | | x | x | x | x |
| 36 | Payment / Billing | Billing Frequency Code | The code representing the frequency at which the loan balance will be re-paid. This is the billing frequency that applies to the loan account.<br>Sample Values:<br>1. Monthly<br>2. Quarterly<br>3. Semi - Annually<br>4. Annually | Text | | | | | x | | | x | x | x | x |
| 37 | Payment / Billing | Original Contractual Payment Amount | The payment amount that is agreed to be paid as per payment schedule at the time of loan origination. | Number | | | | | | | | | x | x | |
| 38 | Payment / Billing | Current Contractual Payment Amount | The payment amount that is agreed to be paid as per current payment schedule | Number | | | | | x | | | | x | x | |
| 39 | Payment / Billing | Total Payment Due Amount | The payment amount due for this loan account as of reporting date. | Number | | | | | | | | | | x | |
| 40 | Payment / Billing | Amortization Type Code | A code that determines how payments are amortized. This code determines the method of increasing/accounting for amount over a period of time.<br>Sample values are:<br>Constant P&I<br>Constant principal,<br>Buy down/subsidy loan<br>Combination of GPM | Number | Classification | | | | | | | | x | x | |
| 41 | Payment / Billing | Pre Payment Penalty Amount | The amount of penalty that will be charged for pre payment on the loan account | Number | | | | | | | | | | x | |
| 42 | Payment / Billing | Pay Off Amount | The total amount that needs to paid for the complete repayment of loan principal, interest and any other sums due as of reporting date | Number | | | | | | | | | | | x |
| 43 | Payment / Billing | Next Payment Due Date | The date by which the next payment is due for this loan account. | Date | | | | | | | | x | x | x | x |
| 44 | Payment / Billing | Next payment Due Amount | The amount that needs to paid to the loan account by Next Payment Due Date. In most of the case this field will be equal to the current contractual amount. | Number | | | | | | | | x | | | |
| 45 | Payment / Billing | Last Payment Date | The date when that last payment was made to the loan account | Date | | | | | | | | x | | x | |

FIGURE 5E

| # | Business Category | Field Name | Data Definition | Data Type | Reference Data Lookup | History | Pertains To | Mandatory | Basel | Credit Quality Book | OCC Reporting | NCC DW | ALM | Fin. Reporting | Economic Capital |
|---|---|---|---|---|---|---|---|---|---|---|---|---|---|---|---|
| 46 | Payment / Billing | Auto Pay Indicator | Indicates whether the loan payment uses pre-authorized transactions. This indicator will determine that the payments on the account can be debited every billing cycle | Flag | | | | | | | | | | | |
| 47 | Payment / Billing | Amortization Term | The period of time over which the loan will be amortized, usually expressed in months. The Amortization term can be different from the actual Loan term | Number | | | | | | | | | | x | |
| 48 | Interest | Interest Compounding Frequency Code | The Code corresponding to the frequency at which the interest is compounded. Sample Values: 1. Monthly 2. Quarterly 3. Semi - Annually 4. Annually | Text | | | | | | | | | | x | |
| 49 | Interest | Interest Rate Type Code | The code corresponding to the Interest Rate type of the account. Possible Value : Fixed or Variable | Number | Classification | | | | x | | | | | x | x |
| 50 | Interest | Reference Interest Rate Index Code | The benchmark interest rate index code that is been used to calculate the interest rate for products having variable interest rate Sample values LIBOR Euribor PIBOR MIBOR UKBASE | Text | Y | | | | x | | | | x | x | |
| 51 | Interest | Original Interest Rate | The interest rate that is associated to this loan account loan at the time of origination. | Perc | | | | | | | | | | x | |
| 52 | Interest | Current Interest Rate | The interest rate that applies to this loan account as of reporting date. | Perc | | | | | x | | | x | | x | x |
| 53 | Interest | Interest Rate Life Cap | The maximum interest rate allowed over the life of the variable rate product. | Perc | | | | | | | | | | x | x |
| 54 | Interest | Interest Rate Life Floor | The Minimum interest rate allowed over the life of the variable rate product | Perc | | | | | | | | | | x | x |
| 55 | Interest | Interest Amount Earned | This is the interest amount earned on the loan account month to date | Number | | | | | | | | | | x | |
| 56 | Interest | Interest Amount Paid | The interest amount paid to this loan account month to date | Number | | | | | x | | | x | | x | x |
| 57 | Interest | Accrued Interest Amount | The amount of interest accrued on the loan account month to date | Number | | | | | x | | | | | | |
| 58 | Interest | Accrued Interest Calendar Basis Code | The Code corresponding to the calendar basis on which the interest accrual on an account is calculated. Sample Value : ACT / 360, ACT / 365, ACT/366 | Number | Classification | | | | | | | | x | x | |

FIGURE 5F

| # | Business Category | Field Name | Data Definition | Data Type | Reference Data Lookup | History | Pertains To | Mandatory | Required For Basel | Credit Quality Book | OCC Reporting | NCC DW | ALM | Fin. Reporting | Economic Capital |
|---|---|---|---|---|---|---|---|---|---|---|---|---|---|---|---|
| 59 | Interest | Adjustment Margin | The difference percentage that is been added to the base index rate to derive the interest rate of the loan account. This can also be referred as spread. | Perc | | | | | | | | x | x | x | |
| 60 | Interest | Adjustment Type Code | Designates how the base rate is to be adjusted by the adjustment rate. Blank=no adjustment applies, P=positively, N=negatively | Number | Classification | | | | | | | x | | x | |
| 61 | Interest | Next Interest Rate Change Date | Date by which the next interest rate adjustment will be applied on the account | Date | | | | | | | | | | x | |
| 62 | Interest | Interest Rate Set Date | Date by which the new interest rate is effective on the account | Date | | | | | | | | | | | |
| 63 | Interest | Interest Rate Life Increase | Maximum interest rate increase allowed during the life of an Commercial Loan | Number | | | | | | | | | | x | x |
| 64 | Interest | Interest Rate Life Decrease | Maximum interest rate decrease allowed during the life of an Commercial Loan | Number | | | | | | | | | | x | x |
| 65 | Fees | Fees Earned | This is the Fees amount earned on the loan account for the current month | Number | | | | | | | | | | | x |
| 66 | Fees | Fees Amount paid | The amount of fees paid month to date on the loan account. This includes all types of fees that are paid for this account in the current month | Number | | | | | x | | | | | x | |
| 67 | Fees | Unpaid Fees Amount | The amount of fees that are charged but are not paid in the current month | Number | | | | | x | | | | | | x |
| 68 | Accrual / Past due / Charge-off | Days Past Due | The number of days past due from the payment due date. This field will be populated if payment is not made to the loan account by the payment due date as of reporting date | Number | | | | | x | | x | | | | |
| 69 | Accrual / Past due / Charge-off | Charge-Off Date | Date on which the loan account is charged off (Charge-Off is the accounting recognition of deterioration in the status of a customer, specifically when the likelihood of debt repayment falls below a certain point or the account reaches a certain stage of delinquency.) | Date | | | | | x | | | | | x | x |
| 70 | Accrual / Past due / Charge-off | Charge-Off Amount | The outstanding loan amount that is been Charged off. In case of full charge off, amount will be equal to the total outstanding amount and in case of partial charge off amount will be less than the total outstanding amount. | Number | | | | | x | | x | | | x | x |
| 71 | Accrual / Past due / Charge-off | Charge-Off LTD Amount | The total outstanding loan amount that is been Charged off since inception of loan as of reporting date. This is also known as "Income to charge Off Amount". | Number | | | | | | | | | | | |

FIGURE 5G

| # | Business Category | Field Name | Data Definition | Data Type | Reference Data Lookup | History | Pertains to | Mandatory | Required For Basel | Credit Quality Book | OCC Reporting | NCC DW | ALM | Fin. Reporting | Economic Capital |
|---|---|---|---|---|---|---|---|---|---|---|---|---|---|---|---|
| 72 | Regulatory | COMPLY FDICIA Code | Indicates whether or not a real estate Loan complies with FDICIA(Federal Deposit Insurance Corporation Improvement Act.). Possible values are Y- Yes, N- NO, X - Exempt. This is also known as Fiduciary Code. | Number | Classification | | | | | | | | | | |
| 73 | Regulatory | COMPLY FDICIA LTV % | This field holds the required LTV% for FDICIA reporting. | Perc | | | | | | | | | | | |
| 74 | Business | Residential Mortgage Flag | Flag to indicate if Loan is based for Residential Mortgage. Possible Values are 'Y', 'N', NULL. Note: Null is treated as 'N' - NO | Flag | | | | | | | | | | | |
| 75 | Business | CRC Managed Code | CRC - Capital Recovery Committee. This flag is set to 'Y' when a Loan is directly managed by CRC. This field is set to 'C' when Loan is consulted with CRC on periodic basis. This flag is set to 'N' when a Loan is not managed by CRC | Number | Classification | | | | | | | | | | |
| 76 | Business | Highly Leveraged Transaction Flag | A bank loan given to a highly leveraged company. Possible values are F = FED, B =BNK, N or Blank = not HLT Note: HLT - Highly Leveraged Transaction | Text | | | | | | | | | | | |
| 77 | Business | Portfolio ID | The portfolio to which Loan belongs to. This is included in Loan ID and forms the record unique in SIF as well as is part of key which is used to integrate the Loan record with CIF. | Text | | | | | | | | | | | |
| 78 | Business | Current GL Balance | The balance reported to General Ledger as of reporting Month. | Number | | | | | | | | | | | |
| 79 | Financial | GL Source System ID | The source system identification code for General Ledger company, account and center | Text | | | | | | | | | | | |
| 80 | Financial | PNC Owned Percent | This is the percentage of loan that is owned by PNC. Values for this attribute range from 0-100. The loan may be fully owned, partially owned or fully serviced. | Perc | | | | | | | | | | | |
| 81 | Basic loan data | Source System Account Life Cycle Status Code | The original value of lifecycle status code from source system. | Text | | | | | | | | | | | |

FIGURE 5H

Customer & Mitigant SIF

- Customer SIF –
  - Customer Info:
    - Name,
    - Customer ID,
    - CIF Key,
    - SSN/TIN
  - Contact Info:
    - Address,
    - Phone Number,
    - Email
  - Interaction Info:
    - Solicitation flags,
    - Open/Close Dates,
    - Internal Entity,
    - Officer
  - Key Financials (where applicable):
    - Assets,
    - Sales,
    - Income

- Mitigant SIF (Includes collateral, gurantees and insurance) –
  - Mitigant Information:
    - Type,
    - Valuation,
    - Expiration
  - Collateral:
    - Property information,
    - Original value,
    - Appraised value,
    - Location
  - Insurance:
    - Provider,
    - Policy information,
    - Term,
    - Coverage,
    - Premium
  - Gurantee:
    - Guarantor,
    - Government Indicator,
    - Value,
    - Term

FIG. 7

BUSINESS CONSTRUCTS

FIELD OF THE INVENTION

The invention generally relates to systems, processes, tools, techniques and strategies for processing information within a computer system architecture. In various embodiments, the invention more particularly relates to processing information within a computing environment operatively associated with a data warehouse.

BACKGROUND

Every corporate organization stores and processes data that is important to the needs and objectives of its customers. The organization may employ various kinds of computer systems to process data and other information based on interaction between the customer and the organization as well as business events that impact the customer.

There are many obstacles that face financial entities as they attempt to manage high volumes of data often collected from multiple sources. For example, credit and liquidity market conditions can drive regulatory and investor demands for accurate and complete information. Also, the pace at which corporate mergers and acquisitions often occur can influence the need for aggregated and properly integrated credit, financial, and customer information. In addition, holistic cross-enterprise information is critical for addressing various operational requirements of financial entities such as Basel II requirements, risk assessments (e.g., credit, market, counter party, and operational risks), balance sheet management, stress analysis and testing, and many others.

In view of the foregoing issues, enhanced tools, techniques and strategies are needed for processing, managing, and communicating business data within a corporate entity.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 2A and 2B schematically depict an example of a business construct structured in accordance with certain embodiments of the invention;

FIGS. 3A through 3D schematically depict an example of a business construct structured in accordance with certain embodiments of the invention;

FIGS. 4A through 4L schematically depict an example of a business construct structured in accordance with certain embodiments of the invention;

FIGS. 5A through 5H schematically depict an example of a business construct structured in accordance with certain embodiments of the invention;

FIG. 7 schematically illustrates examples of attributes of business constructs structured in accordance with certain embodiments of the invention;

DESCRIPTION

Figure 1A:
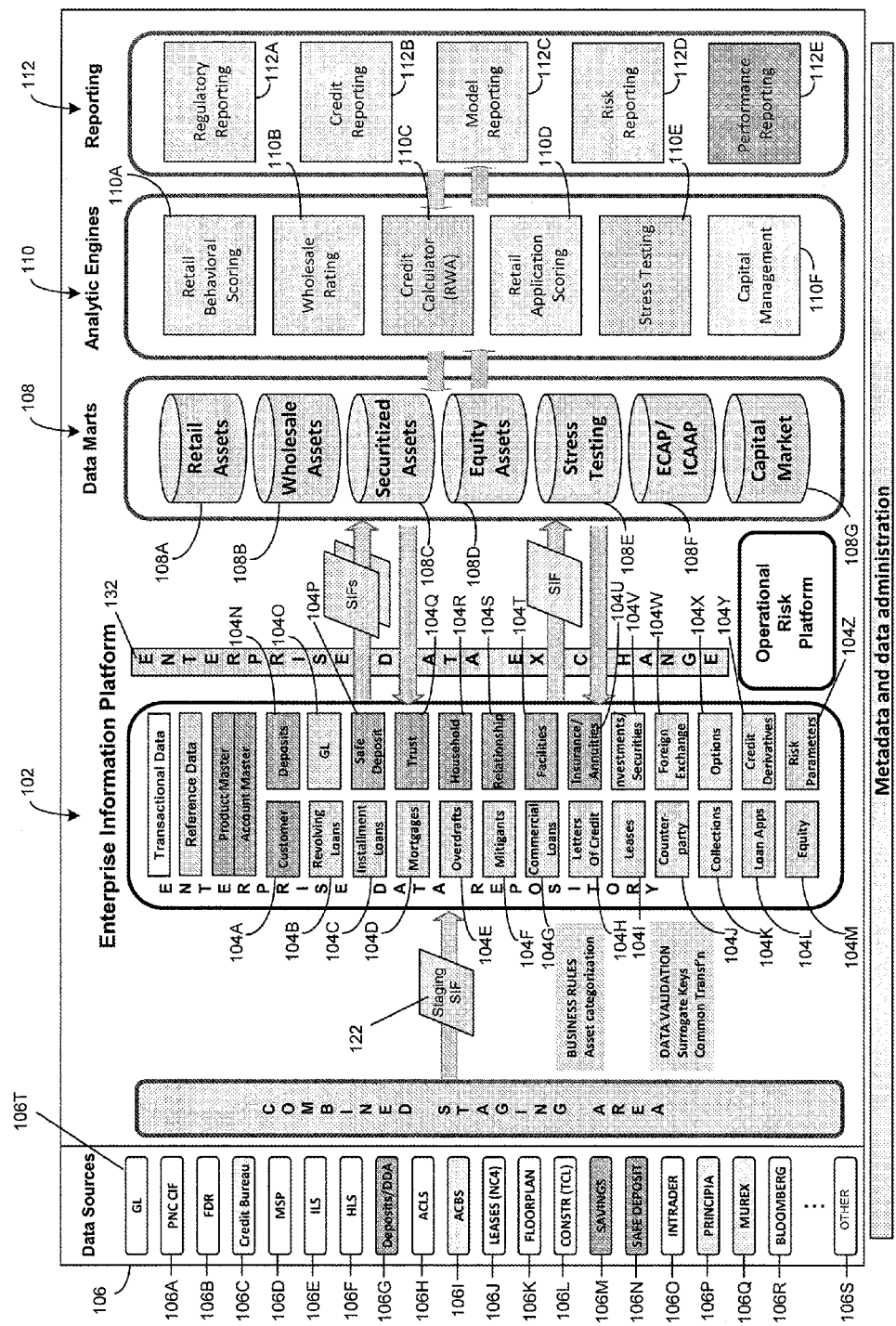
FIGS. 1A and 1B schematically illustrate of examples of a system and process flow structured in accordance with certain embodiments of the invention.

Various embodiments of the invention provide enhanced processes, methods, tools, strategies, and techniques for more effectively and efficiently processing, managing, and communicating data and other information within a computing environment. In certain embodiments, the invention can provide beneficial enhancements to a computing environment including a corporate information factory, for example, and a data warehouse component. As described below, business constructs can be structured and implemented as components which improve performance and effectiveness of a data warehouse logical architecture.

As those skilled in the art will appreciate, a corporate information factory (or "CIF") can be considered a logical computing architecture that serves to deliver business intelligence and business management capabilities in response to data supplied by the various operational aspects of an entity, such as a financial service provider. The CIF provides a stable technical architecture that can be implemented in entities of different sizes and can be useful for building strategic and tactical decision support and business intelligence capabilities. The CIF may be used as an architecture for warehousing the operational data and other information that is employed by an entity. The fundamental implementation principles of a CIF can include orientation of the business intelligence environment; sourcing data from an operational systems environment and external data stores; storing data in both the data warehouse and operational data store in an enterprise view format; supplying data to users through data marts, for example, or other storage components customized for the needs of the users and their separate applications; and, providing metadata management for the computing environment.

In certain embodiments, a CIF may include various architectural components, each with a functional purpose. Examples of these architectural components include operational systems or core systems that execute periodic business operations and record business data. Also, the CIF may include integration and transformation processes (which may be referred to as "ETL" or "extract-transformation-load" processes) that convert operational data into an ordered format for use by a data warehouse component. A data warehouse can be included in the CIF and programmed to deliver a standard view of enterprise data which is independent of how it will subsequently be used by consumers. An operational data store of the CIF may be programmed to supply a common view of enterprise data for operational processing or tactical decision making. The CIF may also include one or more data delivery processes that provide functionality for requesting, prioritizing and monitoring data mart creation and refinement. Various data marts within the CIF can be programmed to support a variety of analytical and reporting requirements of a given business unit or business function. Also, metadata within the CIF can be used to provide the information necessary to promote data legibility, use and administration.

Figure 1B:
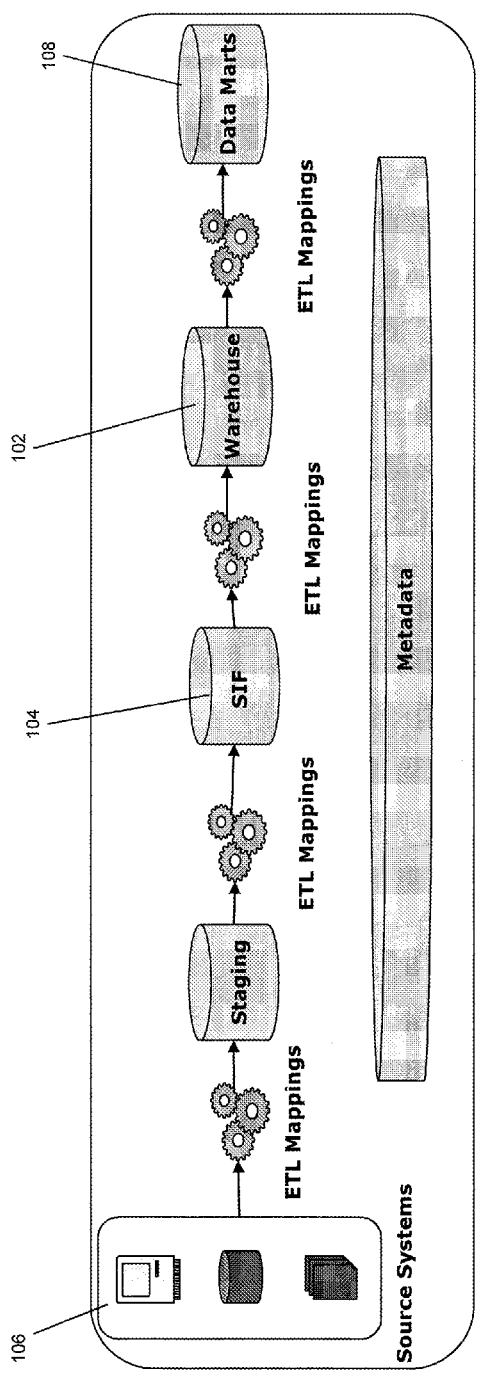

FIGS. 1A and 1B illustrate examples of systems and processes involving an enterprise information platform 102 associated with an entity such as a financial services provider, for example. The logical architecture of the enterprise information platform may be based on the CIF model (as described above) and may include various standard CIF components. In various embodiments, the enterprise information platform 102 may include one or more business constructs 104A-104Z, which can be implemented as a standard interface file (or "SIF") as an architectural component of the CIF logical architecture. In various embodiments, the business constructs 104 can be embodied as software or other programming instructions that execute the functions of a computer system or other processor. Each business construct may be programmed to define one or more data attributes of an object of importance to an entity or corporation. As shown in FIG. 1, examples of the business constructs 104 include "customers" (104A), "revolving loans" (104B), "installment loans" (104C), "mitigants" (104F), and various other kinds of business constructs. In various embodiments, each business construct 104 can be programmed to map, organize, and/or integrate organized and unorganized data managed by one or more data sources or data source systems 106A-106T, for example, into a format that can be used by other components of the computing environment. Examples of data source systems include operational data systems such as general ledger (GL); customer information files (CIFs); loan processing systems; credit card systems (FDR); mortgage systems (MSP); installment loan systems (ILS); underperforming mortgage systems (HLS); asset systems (ACLS and ACBS for commercial lending and business lending, respectively); lease systems (NC4); dealer floor plan systems; construction loans; deposit systems like deposit in DDA savings; safe deposit systems; capital or trading asset systems; capital market systems; and many others.

In other aspects, one or more data marts 108A-108G may be configured to receive data derived from the business constructs 104. In operative association with the data marts 108, one or more analytic engines 110A-110F may implement SIF-derived data stored in the data marts to perform various calculations and other analyses for a financial entity, for example. As shown, one or more different types of reports 112A-112E can be generated in connection with the calculations performed by the analytic engines 110.

An example of a customer type of SIF or business construct is illustrated (in spreadsheet format for convenience of disclosure) in FIGS. 2A and 2B. An example of a customer credit rating SIF or business construct is illustrated (in spreadsheet format for convenience of disclosure) in FIGS. 3A-3D. An example of an installment loans SIF or business construct is illustrated (in spreadsheet format for convenience of disclosure) in FIGS. 4A-4L. An example of a commercial loans SIF or business construct is illustrated (in spreadsheet format for convenience of disclosure) in FIGS. 5A-5H.

It can be appreciated that the structure and implementation of the business constructs can provide integration of data as a preliminary step prior to loading an enterprise data warehouse data model. The business construct may be implemented early in the data warehouse life cycle (e.g., as the first step in the integration and transformation process). As shown in FIG. 1, a staging SIF (business construct) 122 may be used as an interface between the enterprise information platform 102 and one or more of the plurality of data sources 106. This allows ETL mapping processes to be conducted more efficiently and more quickly. Also, when the corporate entity encounters significant changes in its operative association with the source data systems 106, such as in the case of a business merger, acquisition, or other business process reengineering effort, business constructs 104 can provide a layer of abstraction from the underlying changing source systems. This can help to accelerate the integration of information from new data sources 106 into the environment of the enterprise information platform 102.

In various embodiments, source system formatted data may or may not be compatible between or among different source data systems. For example, data associated with installment loans could be stored on a mortgage system such as for a home equity installment loan; stored in a consumer lending system (e.g., HCLS); stored in one or more legacy systems; and/or stored in a small business systems. In this example, the structure and function of the business construct 104 takes into account the myriad source systems 106 associated with installment loans. It can be seen that the business construct 104 provides an interim integration step through SIF file definitions that map the source systems 106 to the SIF and that then integrate the business constructs 104 into the enterprise information platform 102. In certain embodiments, SIF files can be programmed to communicate data into an enterprise data exchange layer ("EDX") 132 and store data derived from multiple business constructs 104 into product, line of business, or functional asset families. For example, a retail asset family could implicate business constructs 104 including revolving loans, installments loans, mortgages, overdraft loans, customers, mitigants, and loan applications. A similar relationship can be formed around wholesale assets, securitized assets, economic capital, or a variety of other classifications. It can be appreciated that the business constructs 104 can be used to more readily integrate data from the source data systems 106 into a data warehouse platform. Also, the business constructs 104 can be used to move data out of the platform 102 and construct "building blocks" for creating other data structures that satisfy the needs of end users.

In one example, suppose that the entity is a financial service provider that has acquired a new bank as part of its corporate structure. Source data systems 106 of the acquired bank may need to mapped just once to specific business construct SIF files with predefined business domain attributes. Once the business constructs 104 have been mapped, then the data of the acquired bank can be transformed into a standard set of information that the acquiring entity can use to describe its business operations. The effort required to load the data into the enterprise information platform 102, to generate integrated reporting, or to analyze the combined population of data can be substantially reduced. Once source data has been mapped to the business constructs 104, the data can be applied to pre-existing downstream processes of the acquiring entity, such as its data marts 108 or analytic engines 110. In various embodiments, only limited customization may be required in the event that the acquisition introduces or requires formation of a new business construct. For example, a unique product offering of the acquired entity may not be supported by the acquiring entity prior to the merger or acquisition.

It can be appreciated that business constructs 104 can be employed as tools that allow computer system architects to decompose complex enterprise data warehouse logical models into comparatively smaller and more streamlined component structures. With reference to FIG. 1, it can be seen that the enterprise information platform 102 can be constructed from multiple business constructs 104. Another benefit of various embodiments of business constructs 104 is that SIF files can be used to accelerate enterprise data governance processes. For example, the data attributes of existing SIF files can be used as the starting point for the definition of other business glossaries. The SIF files can also assist with efforts by different lines of business to reach consensus on standard business definitions and data quality rules or metrics.

In developing certain embodiments of the invention, the inventors have recognized that integrating data early in the data warehousing process has important benefits. Under prior practices, a traditional data warehousing process might have taken data from a data source, and then mapped the data to the data warehouse on an ad hoc source-by-source basis. In other words, each time a new, different data source needed to be introduced, that data source would have been specifically mapped directly to the target data warehouse. In contrast to this historical data mapping process, embodiments of the business construct 104 provide an interim stage for mapping data prior to loading the data into the data warehouse. Embodied as standard interface files, each of the business constructs can represent an entity or an object that is of importance to the corporate entity or other enterprise. It can be seen that the content and format of the business constructs 104 may be changed from industry to industry, or among different business lines, to accommodate different objects of each industry or whatever is important to that particular industry in terms of building the data warehouse. For example, business constructs 104 may be altered to reflect important objects in the automotive industry, for example, as compared to the financial services sector.

Figure 6:
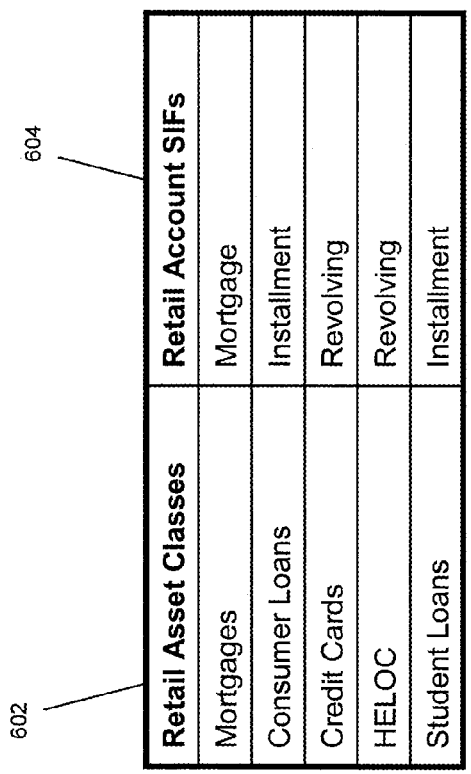
FIG. 6 includes a tabulation illustrating certain aspects of business constructs structured in accordance with certain embodiments of the invention.

The content of each business construct 104 can be designed to include attributes surrounding a revolving loan, for example, and those attributes would be applicable and necessary for any bank or other financial institution that process data related to revolving loans. For example, a "revolving loan" business construct 104 might possess 100 attributes to which any source data system 106 can be mapped. At the stage when data are received and filtered into the revolving loans business construct 104, data can flow through the information architecture of any financial institution that process data associated with revolving loans. No other customization of computing system architecture is required beyond the introduction of additional business constructs 104 to accommodate new source data systems 106, for example. In operation, the business construct 104 can become a universal translator between the enterprise information platform 102 and source data systems 106 that include data relevant to the entity business object around which the business construct 104 has been created. The business construct 104 can include various attributes, or all attributes, common to an archetype of the entity business object on which the business construct 104 is based. In other words, the attributes of the object represented by the business construct 104 can be programmed to be commonly applicable to multiple versions of the same object across multiple corporate entities. In certain embodiments, one or more attributes of business constructs 104 can be determined by asset classes of a financial institution, for example, and/or a general subject area. The business constructs 104 may support one-to-one, one-to-many, and other entity relationships. In one example, a retail assets class may include a "customer" business construct 104, three "account" business constructs 104, and a "mitigant" business construct 104. The table shown in FIG. 6 demonstrates examples of how asset classes 602 can be related to retail account business constructs 604. Also, FIG. 7 schematically illustrates examples of attributes of a "customer" business construct and a "mitigant" business construct.

Figure 8:
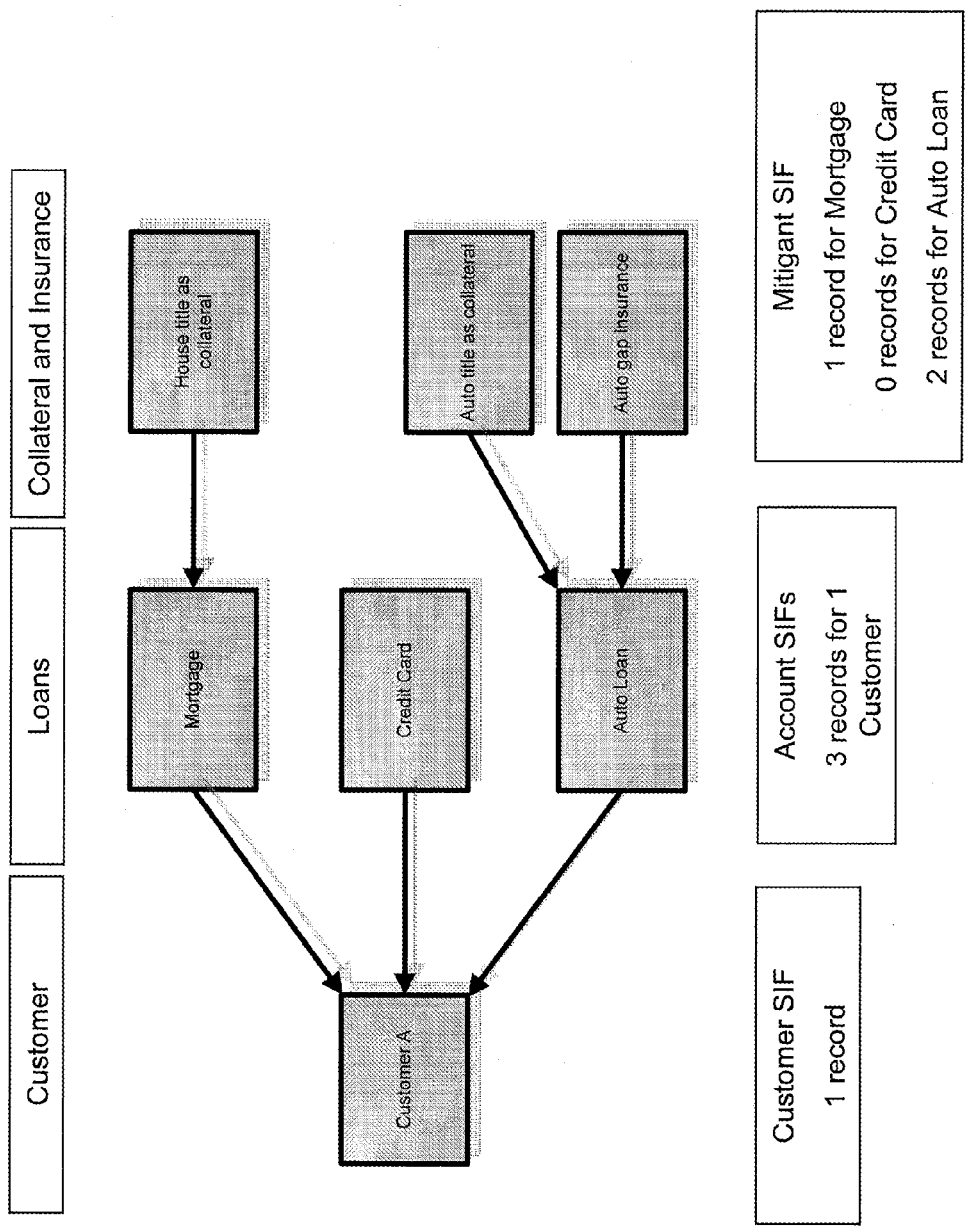
FIG. 8 includes a diagram illustrating an example of how business constructs support data relationships within an entity; and, FIG. 9 includes a diagram illustrating an example of how business constructs represent data for different business objects of an entity.
Figure 9:
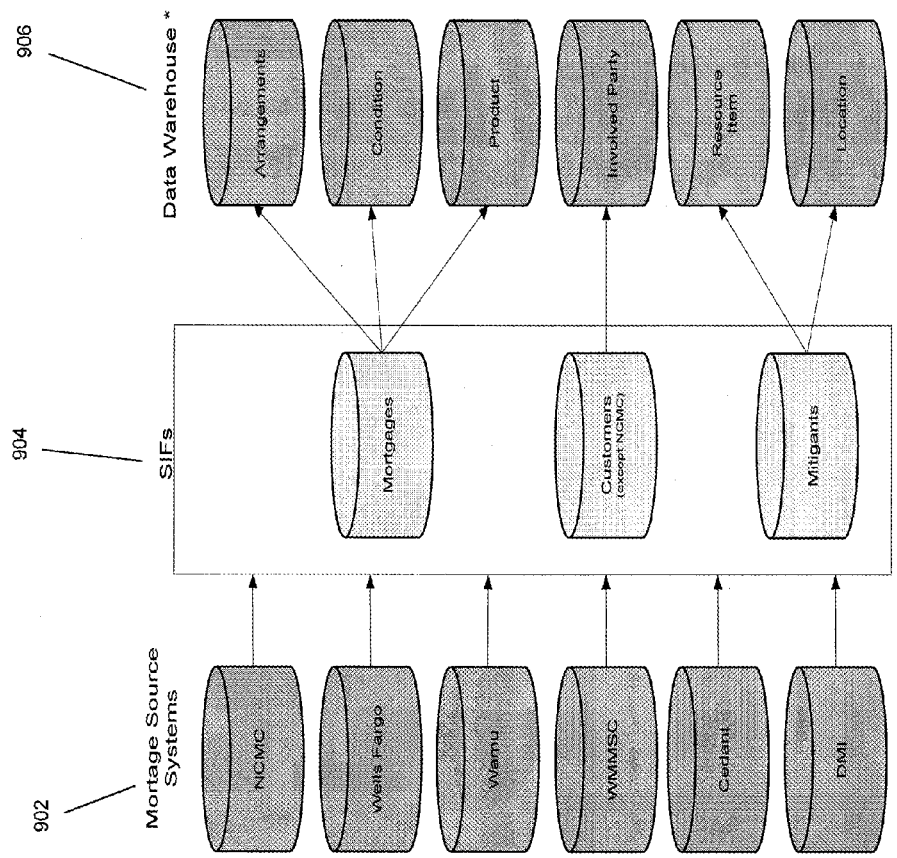

FIG. 8 includes an example that demonstrates how business constructs support data relationships within the entity. Once concern of technologists is to make sure that the entity relationship structures are preserved in a data warehouse. The diagram of FIG. 8 illustrates how customer data within the data warehouse needs to be related to potentially one or many loans, and a loan can be related to one or many types of collateral or other mitigants. The translation from banking data warehouse entity relationship structures to the building blocks represented by business constructions is necessary to understand in constructing appropriate entity relationships. As shown, the customer can have a mortgage, one or more credit cards, and one or more auto loans. Each one of the loans can have one or more pieces of associated collateral. Using business constructs, it can be seen which SIF files are needed to represent transactions or other activity of the customer in the data warehouse. With reference to FIG. 9, in another example, it can be seen how six mortgage source data systems 902 can be standardized in content and structure by using three business constructs 904. This example demonstrates that use of the business construct components 904 facilitates loading data into a data warehouse which may have different data concepts 906 such as arrangements, condition, product, involved party, resource item, and location, as shown.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A system for processing data, the system comprising:
   an enterprise information platform including at least one processor and at least one business construct stored in a computer-readable medium of the enterprise information platform;
   at least one data mart in the enterprise information platform and supporting analytical requirements of a business function related to a corporate entity associated with the enterprise information platform;
   at least one analytic engine in the enterprise information platform operatively associated with the at least one data mart and implementing data derived from the at least one business construct to perform analyses related to the business function of the corporate entity; and
   wherein the at least one business construct is a standard interface file ("SIF") that communicates data into an enterprise data exchange layer of the enterprise information platform and that comprises multiple attributes representing a business object of the corporate entity, wherein the attributes of the business object are commonly applicable to multiple versions of the same business object across multiple data sources; and
   wherein the at least one business construct maps data from at least one data source at an interim stage prior to loading the data into a data warehouse component operatively associated with the enterprise information platform; and
   wherein the at least one data mart supports generating reports associated with the business function of the corporate entity using the at least one business construct.

2. The system of claim 1, wherein the enterprise information platform is further programmed to transmit data loaded by the business construct through at least one information architecture component associated with the business object of the corporate entity.

3. The system of claim 1, wherein the at least one data source is a data source associated with a financial institution and the business construct translates the data in the at least one data source from banking data warehouse entity relationship structures of the financial institution to information structures that are standardized for the enterprise information platform.

4. The system of claim 1, wherein the at least one business construct comprises attributes common to the business object of the corporate entity on which the business construct is based.

5. The system of claim 1, wherein the at least one business construct comprises data associated with an asset class and the asset class is at least one of mitigants, revolving loans, installment loans, and mortgages.

6. The system of claim 1, wherein the at least one business construct maps, organizes, and integrates organized and unorganized data managed by multiple data source systems that are independent of the enterprise information platform into a format for processing by at least one component operatively associated with the enterprise information platform.

7. The system of claim 1, wherein the at least one data mart comprises SIF derived data related to functional asset classes.

8. The system of claim 7, wherein the corporate entity is a financial services provider, and the at least one analytic engine performs calculations associated with the financial services provider.

9. The system of claim 1, further comprising at least one staging standard interface file programmed as an interface between the enterprise information platform and one or more of a plurality of data sources that are independent of the enterprise information platform.

10. The system of claim 1, wherein the corporate entity is a financial services provider and the at least one data source is associated with an entity that was previously acquired by the financial services provider.

11. The system of claim 1, wherein the at least one business construct is a plurality of business constructs, and wherein the enterprise information platform receives data from a plurality of source data systems using the plurality of business constructs.

12. The system of claim 11, wherein data stored in at least one of the source data systems is not compatible with data stored in at least one other different source data system.

13. The system of claim 1, wherein the enterprise information platform is further programmed for communicating data into an enterprise data exchange layer for storing data derived from multiple business constructs in the at least one data mart based on a classification.

14. The system of claim 13, wherein the classification is selected from the group consisting of product, line of business, and functional asset family.

15. The system of claim 1, wherein the business object of the corporate entity is a business object in the financial services industry.

16. The system of claim 1, wherein the business object of the corporate entity is an asset class of a financial institution.

17. A method for development of a data warehouse comprising:
    defining at least one business construct as a standard interface file ("SIF") having at least one predefined business domain attribute that represents a business object of a corporate entity, the at least one predefined business domain attribute of the business object being commonly applicable to multiple versions of the business object across multiple data sources;
    mapping data in a source data system of an entity independent of the corporate entity to the business construct at an interim stage prior to loading the data into a data warehouse component operatively associated with an enterprise information platform of the corporate entity, the data warehouse component comprising a non-transitory computer readable medium;

transforming the data in the source data system into a standard set of information within the at least one business construct that describes business operations of the corporate entity;

loading the data into the data warehouse component of the corporate entity; and applying the data to at least one pre-existing downstream process of the corporate entity.

18. The method of claim 17, wherein applying the data to the pre-existing downstream process of the corporate entity comprises generating integrated reporting based on the at least one business construct.

19. The method of claim 17, wherein the at least one business construct comprises at least one attribute of an asset class of a financial institution.

20. The method of claim 17, wherein the at least one business construct comprises a single business construct, and the single business construct standardizes content from a plurality of source data systems.

* * * * *